US008934901B2

(12) United States Patent
Turnbull et al.

(10) Patent No.: US 8,934,901 B2
(45) Date of Patent: Jan. 13, 2015

(54) HANDOVER BETWEEN MOBILE NETWORKS

(75) Inventors: Rory S Turnbull, Ipswich (GB); David R Wisely, Ipswich (GB); Peter P Smyth, Woodbridge (GB)

(73) Assignee: British Telecommunications Public Limited Company, London (GB)

( * ) Notice: Subject to any disclaimer, the term of this patent is extended or adjusted under 35 U.S.C. 154(b) by 1943 days.

(21) Appl. No.: 11/886,779

(22) PCT Filed: Mar. 15, 2006

(86) PCT No.: PCT/GB2006/000918
§ 371 (c)(1),
(2), (4) Date: Sep. 20, 2007

(87) PCT Pub. No.: WO2006/100438
PCT Pub. Date: Sep. 28, 2006

(65) Prior Publication Data
US 2009/0029703 A1 Jan. 29, 2009

(30) Foreign Application Priority Data
Mar. 24, 2005 (EP) .................................. 05251870

(51) Int. Cl.
H04W 36/00 (2009.01)
H04W 28/16 (2009.01)
H04W 80/10 (2009.01)

(52) U.S. Cl.
CPC .......... *H04W 36/0011* (2013.01); *H04W 28/16* (2013.01); *H04W 80/10* (2013.01)
USPC ........................................................ 455/436

(58) Field of Classification Search
CPC .............................. H04W 80/04; H04W 36/24
USPC ........ 455/566, 439, 432.1, 442, 522.1, 456.5, 455/436, 443, 438; 370/410, 252, 332, 312, 370/331, 329
See application file for complete search history.

(56) References Cited

U.S. PATENT DOCUMENTS

2002/0087674 A1* 7/2002 Guilford et al. .............. 709/223
2004/0005892 A1* 1/2004 Mayer et al. ............... 455/432.1
(Continued)

FOREIGN PATENT DOCUMENTS

EP 0 930 797 A2 7/1999
EP 1435 748 A1 7/2004
WO WO 98/32265 A1 7/1998

OTHER PUBLICATIONS

Written Opinion of the International Searching Authority in PCT/GB2006/000918.
(Continued)

*Primary Examiner* — Kiet Doan
(74) *Attorney, Agent, or Firm* — Nixon & Vanderhye P.C.

(57) ABSTRACT

When a mobile station MS1 determines during communication through a first network (1), that a second network (7) is available that offers better operational parameters for the communication, the mobile station sends a handover announcement (S 5.3) to the first network to offer it an opportunity to improve the operational parameters for the communication through the first network. The first network (1) may in response offer updated operational parameters (S5.6) with a view to encouraging the communication to continue through the first network. A decision (S5.7) whether to make a handover to the second network can then be made by comparing the updated operational parameters for the first network with the operational parameters for the second network.

36 Claims, 9 Drawing Sheets

(56) References Cited

U.S. PATENT DOCUMENTS

| | | | |
|---|---|---|---|
| 2004/0100913 A1* | 5/2004 | Kalliokulju et al. | 370/252 |
| 2004/0114615 A1* | 6/2004 | Virtanen et al. | 370/410 |
| 2004/0233895 A1 | 11/2004 | Linares | |
| 2005/0048970 A1* | 3/2005 | Hannu et al. | 455/432.2 |
| 2005/0070288 A1* | 3/2005 | Belkin et al. | 455/439 |
| 2006/0105815 A1* | 5/2006 | Jendbro et al. | 455/566 |

OTHER PUBLICATIONS

IPER issued Sep. 25, 2007 in PCT/GB2006/000918.
Jung, S. et al, "QoS based vertical handoff method between UMTS systems and wireless LAN networks," 2004 IEEE, pp. 4451-4455.
Chaouchi and Pujolle, "Policy based management framework for Always Best Connected Users," 1$^{st}$ International ANWIRE Workshop, Apr. 22, 2003, Glasgow, UK, pp. 96-109.

* cited by examiner

OR

HANDOVER BETWEEN MOBILE NETWORKS

This application is the US national phase of international application PCT/GB2006/000918 filed 15 Mar. 2006 which designated the U.S. and claims benefit of EP 05251870.1, dated 24 Mar. 2005, the entire content of which is hereby incorporated by reference.

This invention relates to an improved handover between mobile networks.

BACKGROUND OF THE INVENTION

Mobile communication devices when roaming can perform handovers between different networks. For example, in cellular telecommunication networks, a mobile station can roam from one network to another but, usually, roaming is only permitted between networks for which the subscriber's network provider has a roaming agreement. The mobile station may itself be in range of other networks but it can only roam to those that have a roaming and billing agreement with the network provider.

Mobile communication can be provided by different types of networks. For example, cellular radio telecommunication networks are widely available e.g. complying with the Global System Mobile (GSM) recommendations. GSM networks can handle data as well as voice communication using general packet radio service (GPRS). Recently, broadband services for voice and data have been introduced in so-called third generation (3G) networks according to the ITU-2000 recommendations.

Also, wireless local area networks (WLAN) are used to provide broadband mobile communication with mobile stations such as portable computers or personal digital assistants (PDAs) WLANs comprise a wireless access point that provides a wireless connection to mobile stations within range. The access point may be connected through a core IP network such as the Internet to content providers. Wide area LANs are also proposed for example to provide an information service in the town centre. Smaller area LANs are commercially available to users in coffee shops and other public locations such as airports. Many WLANs operate to IEEE802.11 Recommendations. Typically, WLANs have a wider bandwidth capability than cellular telecommunications networks and the cost of usage to the subscriber may be different from cellular mobile networks.

Hitherto, when a user of a mobile station wishes to roam from e.g. a cellular mobile telecommunications network to a WLAN, communication with the cellular network is terminated and communication with the WLAN is opened. The decision on which network provides the most appropriate communication is determined on the basis of the user's knowledge of the capabilities of the networks concerned. For example, if the user roams into a coffee shop where a WLAN is available that offers a broadband communication over the Internet, it may be more convenient to download content from the Internet through the WLAN.

Sungkwan Jung et al, in "QoS based vertical handoff method between UMTS systems and wireless LAN networks", Vehicular Technology Conference, 2004, VTC2004-Fall. 2004 IEEE 60th Los Angles, Calif., USA 26-29 Sep. 2004, ISBN: 0-7803-8521-7 describes a handoff method which increases the QoS during handoff.

Similarly, International Patent Application number WO98/322 entitled "Determination of Service Situation in a Packet Radio Network", describes a method for indicating the prevailing service situation in a packet radio network where several classes of service are determined.

However, the above prior art does not consider increasing QoS to obviate any need for handoff once a handoff has been determined as necessary due to the prevailing QoS. The invention seeks to modify the prevailing QoS if a handoff is indicated as desirable due to the prevailing QoS to prevent handoff from occurring. The present invention thus provides an improved way of deciding whether to make or obviate a network handover.

BRIEF SUMMARY OF THE INVENTION

In accordance with the invention, if a terminal determines during communication through a first network, that a second network is available that offers better operational parameters for the communication, the terminal sends a handover announcement to the first network to offer it an opportunity to improve the operational parameters for the communication through the first network. The first network may in response offer updated operational parameters, with a view to encouraging the communication to continue through the first network. A decision whether to make a handover to the second network can then be made by comparing the updated operational parameters for the first network with the operational parameters for the second network.

According to the invention there is provided a method for a mobile network to retain a connection with a terminal operable to communicate through different mobile networks, the method comprising the steps of: establishing a, communication between the mobile network and the terminal under a first set of operational parameters, receiving an announcement at a node in the mobile network from the terminal, the announcement indicating that the terminal has identified a second network capable of supporting the communication under a second set of operational parameters, and the mobile network responding to the announcement, by updating operational parameters for the communication currently established with the mobile terminal.

The updated operational parameters may be such as to obviate any requirement for the terminal to handover the communication to the identified second network.

The invention also includes a method performed at a terminal operable to communicate through different mobile networks, to determine whether to make a network handover, comprising: after having established a communication with the terminal through a first of the mobile networks under a first set of operational parameters, identifying a second network capable of supporting the communication under a second set of operational parameters, sending a handover announcement from the terminal, and configuring the terminal to receive a response to the handover announcement from the first network, indicating that the first network will provide updated operational parameters for the communication for obviating a handover to the second network, such that a handover for the communication from the first to the second network can be initiated selectively in dependence on the response.

The invention further includes a method of operating a first network, comprising receiving a handover announcement from a terminal signalling that it is to roam to a second network, determining if communication for the terminal can be established through the first network according to updated operational parameters for obviating roaming to the second network by the terminal, and changing the operational parameters of the first network if the communication is to continue through the first network.

The invention also provides a method of providing a data delivery service through different networks to a terminal, comprising delivering content in a communication established through a first network with a first set of operational parameters, receiving a handover announcement signal form the terminal that signals an impending handover to a second network, and negotiating updated operational parameters for the first network for obviating a handover by the terminal to the second network.

Also included according to the invention is a method performed for a terminal between different networks, comprising: after having established a communication with the terminal through a first of the mobile networks under a first set of operational parameters, identifying a second network capable of supporting the communication under a second set of operational parameters, sending a handover announcement from the terminal, providing for the first network updated operational parameters for the communication for obviating a handover to the second network, and enabling a decision as to whether to perform a handover to the second network based on a comparison of the updated parameters for the first network and the operational parameters for second network.

The invention also provides a handover announcement signal sent by a terminal to a first network, to signal that it is to roam to a second network, the handover announcement including announced values of operational parameters for network communication based on operational communication parameters available through the second network for the terminal, whereby to provide the first network an opportunity to change its operational parameters for communication with the terminal to obviate roaming to the second network.

The invention further includes each of a terminal, first network and network arrangement and a data service provider configured to perform the aforesaid methods.

The preferred aspects of the invention as set out above and in the accompanying independent claims may be combined with each other and with any of the embodiments of the invention as set out herein and in the dependent claims in any appropriate manner apparent to those of ordinary skill in the art.

In order that the invention may be fully understood, the embodiment will now be described by way of example with reference to the accompanying drawings in which:

DETAILED DESCRIPTION OF THE INVENTION

Network Overview

Figure 1:
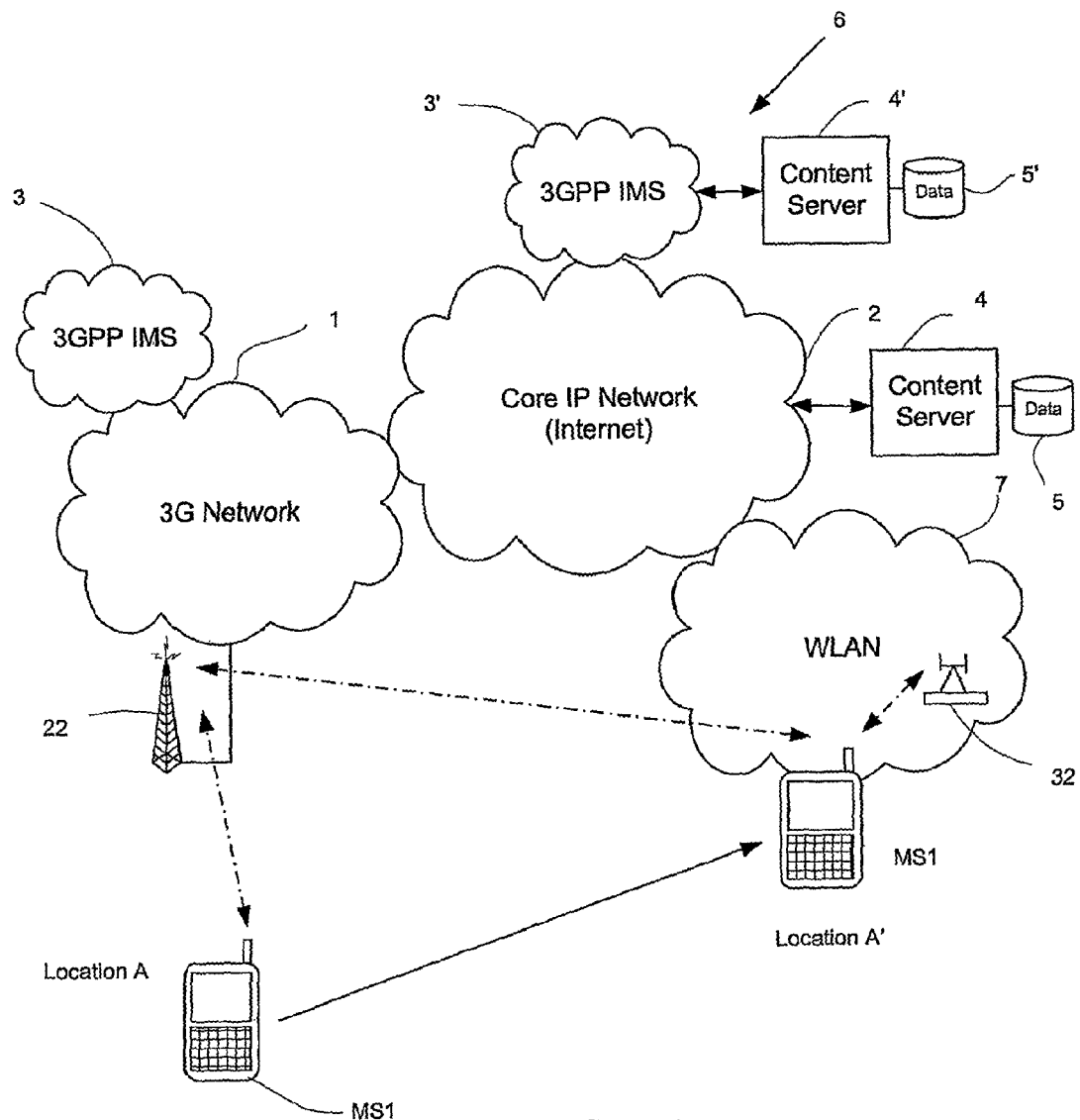
FIG. 1 is an overview of a network configuration in which a handover according to the invention can be performed.

Referring to FIG. 1, a mobile station MS1 in location A is in communication with a third generation (3G) cellular mobile telecommunications network 1 that is coupled through a core IP network 2, the Internet in this example. The network 1 has an Internet multimedia subsystem (IMS) 3 which may operate according to 3GPP Release 5 in order to establish a connection through the Internet 2 to the 3G network 1 and negotiate a quality of service and bandwidth for the communication. The IMS 3 can access one or more content servers such as content server 4 coupled to the core IP network 2, to download data from a store 5 to the mobile station MS1 through the core IP network 2 and the 3G network 1.

Also, a service provider 6 comprising a different commercial entity from the operator of the 3G network 1, has its own IMS 3' with an associated server 4' and data content store 5' to provide bespoke content to users. The service provider 6 has a billing contract with the operator of the 3G network for its communications that are routed through the 3G network.

The mobile station MS1 can move to location A' where radio communication with wireless network WLAN 7 can be established. The WLAN 7 is connected through the Internet 2 to the content server 4.

Thus, when in location A', the mobile station MS1 can receive data from the content server either through the 3G network 1 or through the WLAN 7. Typically, the bandwidth for the WLAN 7 is greater than that available through the 3G network 1. Also, the tariff for communication through WLAN 7 may be different from that for the 3G network 1; typically WLAN 7 is cheaper than the 3G network 1, but not always.

Figure 2:
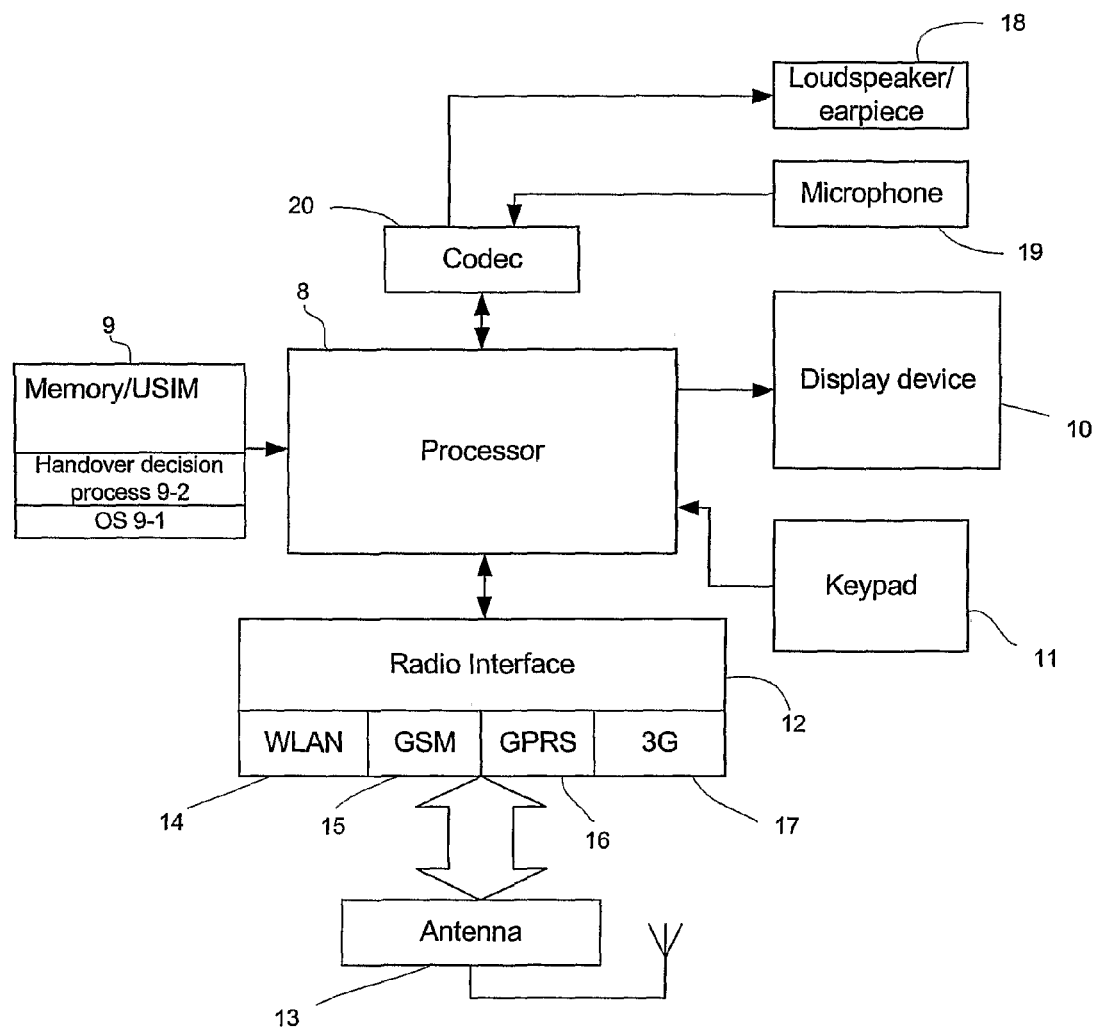
FIG. 2 is a schematic block diagram of a mobile station for use in the configuration of FIG. 1.

FIG. 2 illustrates the major circuit components of the mobile station MS1. The mobile station MS1 may comprise a 3G handset capable of handling both voice telephony and data through 3G and GSM networks with GPRS. Alternatively, MS1 may comprise a personal digital assistant (PDA) or a laptop computer that is enabled for radio communication with the networks 1, 7. The mobile station MS1 comprises a main processor 8 with an associated memory arrangement 9. The memory 9 can be of any suitable form, for example RAM and ROM together with rewritable storage such as flash memory or a hard disc. The memory 9 contains an operating system 9-1 for the processor 8 and a handover decision program 9-2 for processing network handover decisions Also, a SIM card (a USIM in this example, for a 3G network) is included within the memory arrangement 9 for authentication purposes in a manner well-known in the art. The processor drives a display device 10, e.g. a liquid crystal display panel under the control of a keypad 11.

The processor 8 can communicate with the networks 1, 7 as shown in FIG. 1 through a radio interface 12 coupled to an antenna arrangement 13.

The radio interface 12 includes circuit configurations for communicating with the different networks and components 14-17 allow communication with wireless LANs e.g. WLAN 7, GSM networks with GPRS and 3G networks.

Voice telephony and audio outputs are fed to and from the processor 8 by means of a loudspeaker/ear piece arrangement 18 and microphone 19 through a codec 20.

Thus, the mobile station MS1 can be used with different networks for voice telephony and also to transmit and receive data e.g. audio and video downloads from the content server 4.

Figure 3:
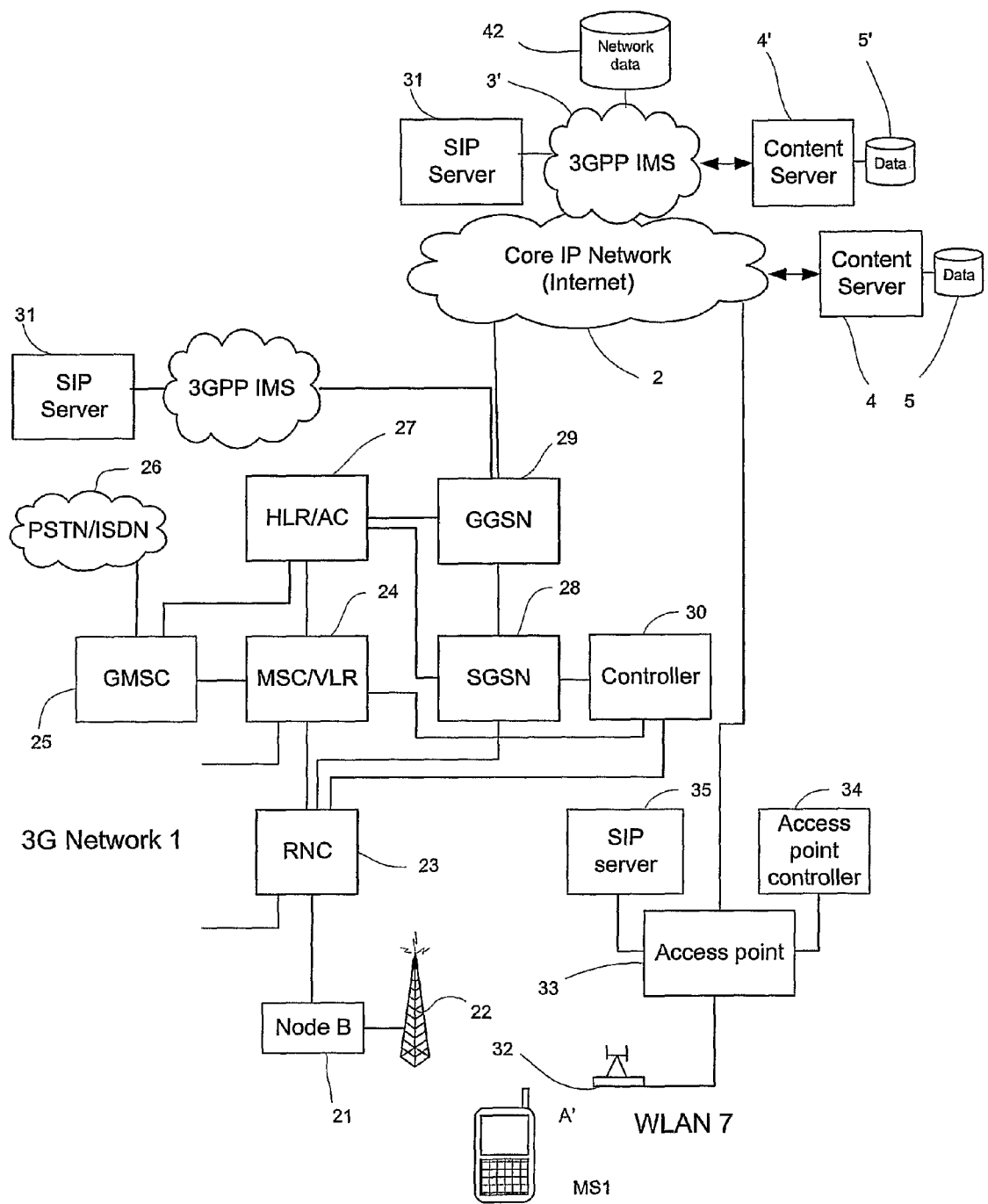
FIG. 3 is a block diagram illustrating the components of the networks in more detail.

The 3G network 1 and the WLAN 7 will now be described in more detail with reference to FIG. 3. The 3G network 1 is configured generally in accordance with the ITU-2000 Recommendations and comprises a series of base stations, one of which is shown, Node B 21, that controls radio communication through antenna 22 for a cell of the network. A group of such base stations 21 is controlled by a radio network controller (RNC) 23.

A mobile switching centre (MSC) 24 which also acts as a visitor location register (VLR) can route calls through a gateway MSC (GMSC) 25 to and from a public service telephone network (PSTN) 26 that can also handle ISDN communications. The network 1 includes a home location register (HLR) 27 that also acts as an authentication centre (AC). The MSC/VLR 24, GMSC 25 and HLR/AC 27 act in a conventional manner to allow calls to be routed to and from the PSTN 26 through the MSCNLR 24 to an appropriate RMC, Node B and antenna for communication with individual mobile stations at different locations in different cells of the network. The MSCNLR 24 monitors mobile stations that roam to the network 1. The HLR 27 keeps a record of home subscribers to the network 1 and forms a conventional authentication function when communication is initiated with individual mobile stations through the network.

Also, the 3G network 1 can route packet data to and from the mobile station MS1 using GPRS through a GPRS support node (SGSN) 28 and a gateway GPRS support node (GGSN) 29 connected to the core IP network 2 i.e. the Internet. Thus, packet data which in this example is TCP/IP format, can be communicated to and from the mobile station MS1 through the network 1. In the following example, a data download from the content server 4, such as a video download is communicated through the core IP network 2 and the 3G network 1 to the mobile station MS1. The network 1 is also capable of communicating data to and from other sources either through the Internet 2 or for example through an Ethernet (not shown) connected to GGSN 29.

As well known in the art, the bandwidth allocated to the data passing through the network 1 can be controlled. The bandwidth is controlled by RNC 23, SGSN 28 and GTSM 29 and the allocated bandwidth is communicated to the MSC/VLR 24 and HLR 27. Thus, the bandwidth control is distributed through the network 1 but, for the purposes of explanation, the bandwidth and other quality of service parameters are shown in FIG. 3 to be controlled by a controller 30, illustrated as a separate unit. However, those skilled in the art will appreciate that the functionalities of controller 30 can be distributed throughout the network or located at one of the other network components shown in FIG. 3.

The IMS 3 includes a SIP server 31 that processes requests in session initiation protocol (SIP) according to the IETF standard peer to peer protocol (RFC 2543).

The WLAN 7 comprises an antenna 32 connected to an access point in the form of a transceiver modem 33 coupled to the Internet 2, for transmitting TCP/IP packet data to and from the network 2 through antenna 32 to and from the mobile station MS1 when in location A'. An access point (AP) controller 34 controls wireless access to the WLAN 7 and a SIP server 35 processes SIP requests to the network.

Operation

1. Roaming from a Download Set Up by IMS3 (Network 1)

Initially, the mobile station MS1 is at location A and the subscriber wishes to stream video from content server 4 and associated store 5 through the agency of the 3GPP IMS 3 of network 1, through the Internet 2 and the 3G network 1. The download may comprise a movie for display on the mobile station MS1.

Figure 4:
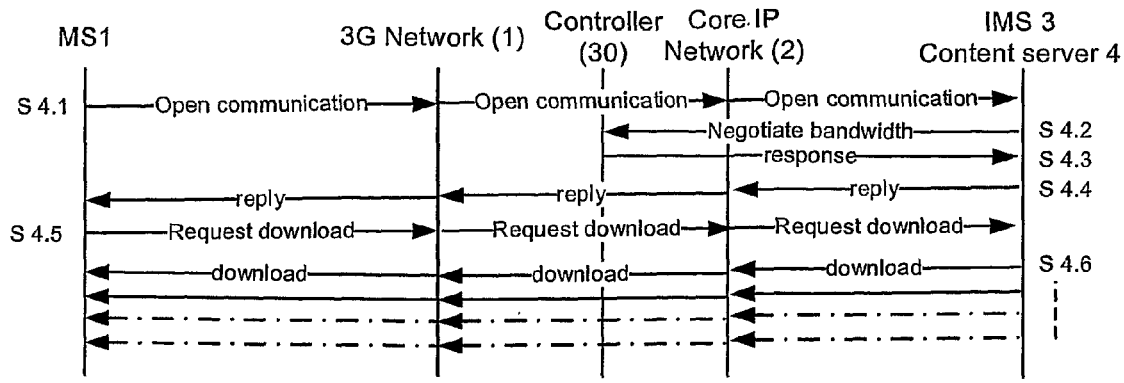
FIG. 4 is a signalling diagram that illustrates the downloading of IP data from a content server to a mobile station through the 3G network.

A call is initiated between mobile station MS1 and antenna 22 in accordance with the usual 3G protocol and, referring to FIG. 4, at step S4.1, mobile station MS1 sends a session initiation request with an appropriate IP address to the IMS 3 to request media to be downloaded from content server 4 through the 3G network 1 and the core IP network 2. The communication may comprise a session initiation protocol (SIP) request according to the IETF standard peer to peer protocol (RFC 2543) which is processed by the SIP server 31.

In response to the SIP request, the IMS 3 negotiates with the controller 30 of network 1 at step S4.2 to establish appropriate bandwidth for the quality of service needed for the requested download from content server 4. At step S4.3, the controller indicates to the IMS 3 the available bandwidth and quality of service for the download. In this example, the 3G network 1 may be able to offer a connection of 100 Kbit/s; this is sufficient for a poor quality but watchable picture on the display 10 of the mobile station MS1. The SIP transmitted at step S4.1 may have requested a communication at 500 Kbit/s to provide a suitable quality of service. However, the network 1 may be congested and during the negotiation at step S4.2, only 100 Kbit/s is offered in the response at step S4.3 to the IMS 3.

The outcome of the negotiations at step S4.2 and 4.3 is communicated at step S4.4 through the core IP network 2 and network 1 to the mobile station MS1.

Assuming that the subscriber wishes to proceed with the download, a SIP request is sent at step S4.5 to the IMS 3 to instruct the content server 4 to download the video stream to MS1 through the networks 2, 1, as illustrated as step S4.6.

Roaming to the Coverage Area of WLAN 7

Figure 5:
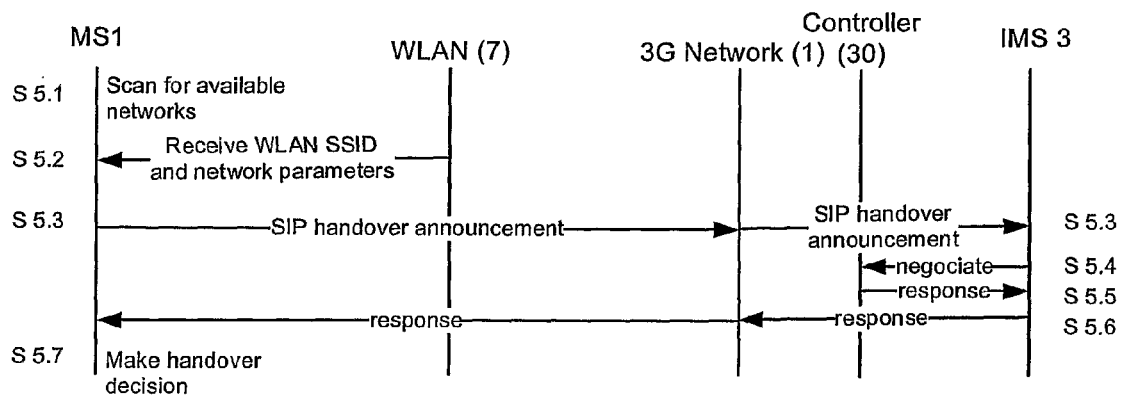
FIG. 5 illustrates a handover announcement sent by the mobile station to the 3G network in the event that a WLAN is detected.

At location A, (FIG. 1) the mobile station MS1 is in communication solely with the network 1. Thereafter, the mobile station MS1 moves to location A' and so can communicate through either of the networks 1 and 7. When in location A' and whilst receiving the download at step S4.6 through network 1, the mobile station MS1 makes a decision whether to handover from 3G network 1 to WLAN 7, as illustrated in the signalling diagram of FIG. 5.

As well known in the art, WLAN 7 may be configured according to IEEE 802.11 and broadcasts a service set identity (SSID) on an individual radio channel. In this example, the mobile station MS1 scans for the SSIDs of available networks, by means of its radio interface 12 and antenna 13, as illustrated at step S5.1.

At step S5.2, the mobile station MS1 receives details of the SSID for WLAN 7 on reaching the location A'. The broadcast information from WLAN 7 also includes details of the operational parameters available for communication through the network 7. One of the operational parameters may be bandwidth. For example, WLAN 7 may offer 500 Kbit/s broadband wireless communication with the mobile station MS1. The network operational parameters may also include details of the call costs through the network 7. In some circumstances, the LAN 7 may be offered to users at no charge, for example in a town centre whereas for other locations such as in a hotel or airport, a charge may be made for communication through the network 7.

Handover Announcement

In accordance with the Invention, before making a handover to the broadband service offered by WLAN 7, the mobile station MS1 provides the network 1 with an opportunity to improve upon the communication parameters currently available for the video download being performed at step S4.6 to obviate the need to perform a handover to the WLAN 7. To this end, the mobile station MS1 transmits a handover announcement to the IMS 3, which may be conveyed through the network 1. The handover announcement signal may conveniently comprise a SIP signal shown schematically in FIG. 6. The SIP handover announcement comprises a header portion 36 and a data payload portion 37. The data header portion 36 includes an IP address 36a for IMS 3 together with a header 36b signifying that the SIP is a handover announcement. The data payload portion 37 includes the identity (MSISDN) of MS1 and the identity of (SSID) WLAN 7 together with communication parameters available if a communication were to be established through WLAN 7 e.g. bandwidth available through network 7, cost parameters for communications to the network 7 and other relevant data e.g. frame rate min and max bandwidth, multicast support and signal path delay. This data was communicated to MS1 at step S5.2. The data may also include a certificate obtained from a third party server (not shown) to authenticate that the parameters are genuine i.e. for a genuine handover and not an improper attempt to negotiate better network parameters from the network 1.

Upon receipt of the SIP handover announcement, the IMS 3 negotiates with the controller 30 of network 1 to determine whether improved operational parameters for communication can be provided by the network 1 to obviate the requirement for a handover to WLAN 7. In this way, the network 1 may be able to continue providing a service to the mobile station MS1 for the download and prevent the service from transferring to WLAN 7. For example, it may be that at this time, the network 1 is less congested and bandwidth can be freed up so as to provide an improved bandwidth for the download. Bandwidth for MS 1 may also be found by reducing the bandwidth available to other users of the network that have not requested a handover. Also, the network 1 may be able to change the basis on which the subscriber is charged for the download. If at the relevant time, the network 1 is being under utilised, the controller 30 may be programmed to offer a reduced charging rate in order to hold onto the download service albeit at a reduced charging rate. This may be preferable to losing the download service to the WLAN 7. Thus, the outcome of the negotiations performed at step S5.4 comprises a new of communication parameters for the download through network 1, which may or may not constitute an improvement on those currently being used.

The outcome of the negotiations performed at step S5.4 is then communicated by the controller 30 to IMS 3 at step S5.5. It will be appreciated that the outcome of the negotiations may not match exactly the data provided in the payload portion 37 of SIP 33. Nevertheless, the bandwidth available as a result of the negotiations together with any modifications to the cost parameter for communication through network 1 are communicated at step S5.6 to the mobile handset MS1 through the network 1. The data downloaded at step S5.6 may be accompanied by a certificate to authenticate to MS1 that the newly negotiated parameters are genuine. For example, the network 1 may be required to refer the negotiated communication parameters to a regulatory server (not shown) to obtain the certificate, which is only granted as long as the parameters are credible and comply with regulatory requirements. This may prevent the network 1 following a predatory policy of slashing its prices excessively in response to handover requests in order to prevent the handover and keep the business.

Handover Decision

Then, at step S5.7 a handover decision is made. In this example, the decision is made at the mobile station MS1 although it can be made at other network locations as will be explained in more detail later. The handover decision is made on the basis of the bandwidth, charging rate and other key data for WLAN 7 as compared with the newly negotiated bandwidth, charging rate and other data for the 3G network 1, communicated to the handset in step S5.6.

Figure 7:
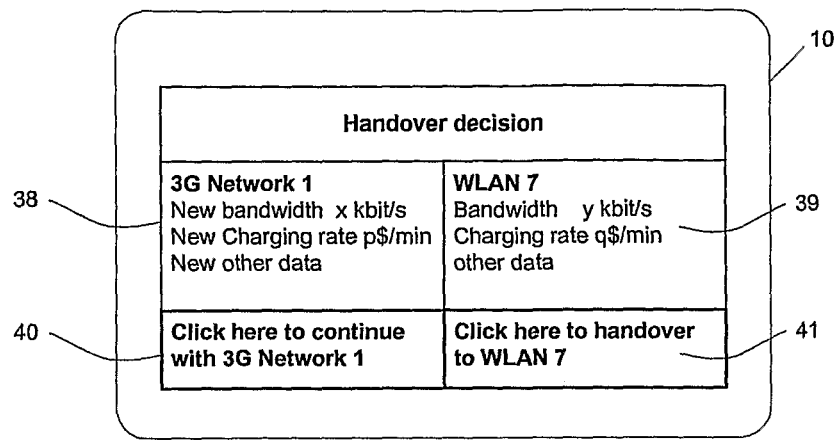
FIG. 7 illustrates a display on the screen of the mobile station to permit a user to make a handover decision.

In one example, the comparison is made manually by displaying the relevant parameters on the display device 10 of the mobile station shown in FIG. 2. An example of the display is shown in FIG. 7. The new data communicated at step S5.6 for the 3G network 1 is shown in display box 38 and corresponding data for WLAN 7 is shown in display box 39. Actuation regions 40, 41 can be actuated by the use of a cursor or like focus device to select the network 1 or the WLAN 7. To make the decision, the subscriber reviews the data in the blocks 38, 39 and decides which is most preferable. It may be that the characteristics for the 3G network 1 are less favourable than those of WLAN 7. However, if the mobile station MS1 is on the move and is likely to move outside of the coverage area of WLAN 7 before the download is completed, it may still be preferable to continue with the 3G network 1, but with the advantage that the network 1 may offer better terms than were available when the download was initially requested at step S4.5.

The handover decision-making process may be performed or assisted by the software 9-2 held in memory 9 and run on processor 8 shown in FIG. 2. The decision-making may be performed according to artificial intelligence (AI) techniques, fuzzy logic or other approaches known per se in the art.

Handover to WLAN 7

Figure 8:
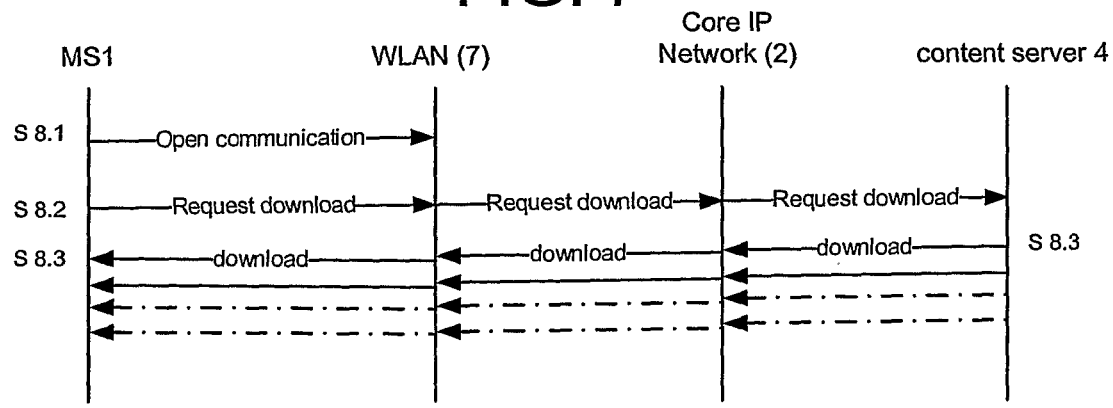
FIG. 8 is a signalling diagram that illustrates downloading of content from the server through the WLAN in the event that a handover is performed to WLAN.

FIG. 8 illustrates the signalling that occurs in the event that handover is made to the WLAN 7. At step S8.1, wireless communication is established between the mobile station MS1 and the WLAN 7 through the antenna 32 and transceiver/modem 33 shown in FIG. 3. The opening of communication is performed according to the usual protocols associated with IEEE-802.11.

Then, at step S8.2, the download i.e. the video stream, is requested from content server 4, through WLAN 7 and the core IP network 2. The download request made at step S4.2 may comprise a SIP request for a download session with content server 4 as previously described in relation to step S4.5, which is processed by the SIP server 35. Session layer or application layer software may be utilised to ensure that the download continues through the WLAN 7 from the point at which it discontinued through the network 1.

Continuance with Network 1

Figure 9:
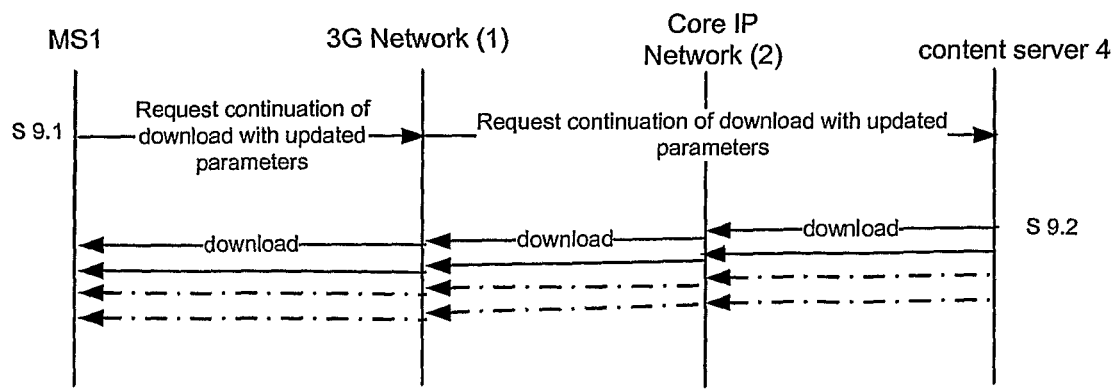
FIG. 9 is a signalling diagram that illustrates a reconfiguring of 3G network in response to the handover announcement shown in FIG. 5 so that the downloading of content continues from the content server to the mobile station through the 3G network.

However, if the download decision was to continue downloading the video data through the 3G network 1, signalling is performed as shown in FIG. 9. At step S9.1, the mobile station MS1 transmits a request to continue with the download, using the updated network parameters negotiated at steps S5.4 and 5.5. The request may be transmitted as a SIP request through network 1 and core IP network 2, to IMS 3 to processed by server 31.

In response, IMS 3 instructs the content server 4 to perform the download, e.g. with a bandwidth corresponding to the newly negotiated bandwidth for the 3G network 1. The network 1 was already made aware of the newly negotiated parameters at step S5.6 and so allows the download to proceed according to the new parameters. It will be appreciated that the download may continue seamlessly so that the user only notices an improvement in the bandwidth with no break in service. Alternatively, download may cease for a short period while the handover decision is made at step S5.7.

Thus, according to the invention, when the mobile station MS1 moves into the coverage area of WLAN 7, which may provide improved parameters for downloading, the network 1 is given an opportunity to improve and update its download parameters before a decision to handover to WLAN 7 is made.

2. Roaming from a Download Set up by IMS 3' (Service Provider 6)

In the first example described above, the download was commenced through 3G network 1 and when MS1 roamed to the coverage area of WLAN 7, a decision was made whether to hand over to WLAN 7 or continue with network 1. The download was initially controlled through the IMS 3 associated with network 1 from a content provider 4 coupled to the Internet 2.

Figure 10:
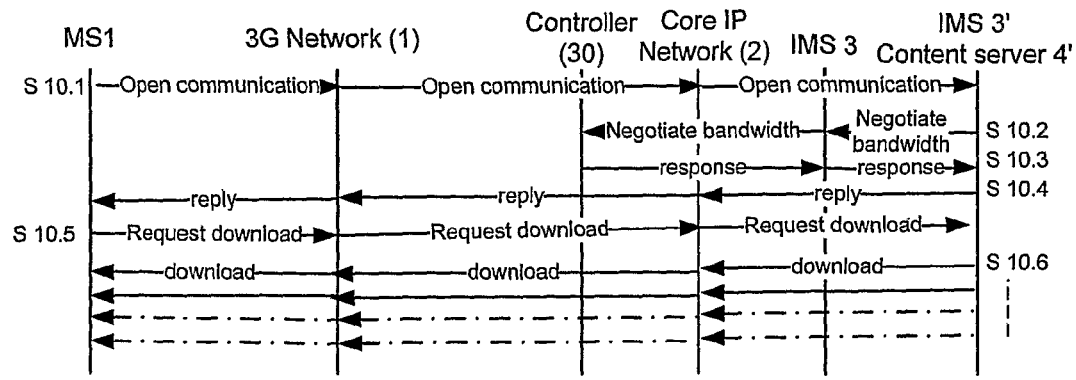
FIG. 10 is a signalling diagram for a second example of the invention for the downloading of IP data from a service provider to the mobile station through the 3G network.

In the following second example, the download is obtained from the service provider 6 i.e. from content server 4' and data store 5', under the control of IMS 3'. Initially MS1 is in location A and the download is commenced as shown in FIG. 10. The procedure is generally similar to that shown in FIG. 4 although communication is established with the content server 4' of the service provider 6 rather than content provider 4.

In more detail, a call is initiated between mobile station MS1 and antenna 22 in accordance with the usual 3G protocol and, referring to FIG. 10, at step S10.1, mobile station MS1 sends a SIP request with an appropriate IP address to the IMS 3' to request media to be downloaded from content server 4' through the 3G network 1 and the core IP network 2. The SIP request is processed by SIP server 31.

In response to the SIP request, the IMS 3' of service provider 6, negotiates with the IMS 3 of network 1, which in turn negotiates with the controller 30 of network 1 at step S10.2 to establish appropriate bandwidth for the quality of service needed for the requested download from content server 4'. At step S10.3, the controller 30 indicates to the IMS 3' the available bandwidth and quality of service for the download. The outcome of the negotiations at step S10.2 and S10.3 is communicated at step S10.4 through the core IP network 2 and network 1 to the mobile station MS1.

If the subscriber wishes to proceed with the download, a SIP request is sent from MS1 at step S10.5 to the IMS 3' to instruct the content server 4' to download the video stream to MS1 through the networks 2, 1, as illustrated as step S10.6.

Figure 11:
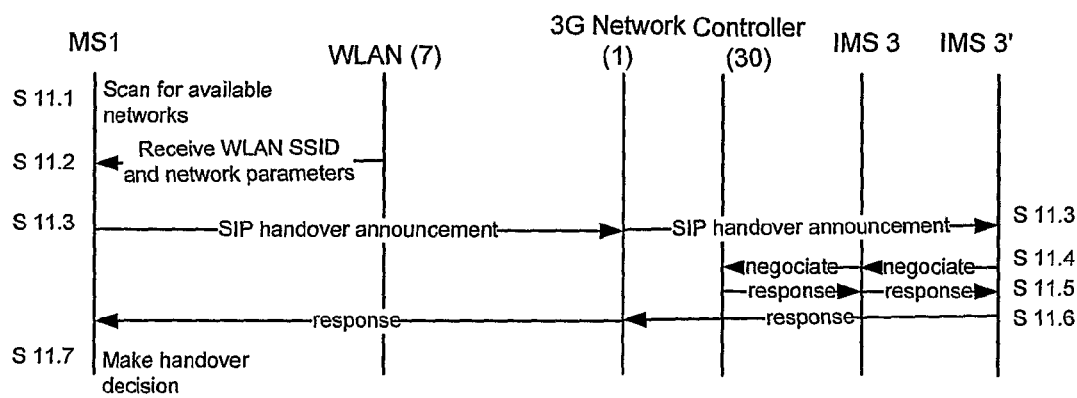
FIG. 11 illustrates a handover announcement sent by the mobile station in the event that a WLAN is detected during the downloading shown in FIG. 10.

Thereafter, the mobile station MS1 moves to location A' and so can communicate through either of the networks 1 and 7. When in location A' and whilst receiving the download through network 1, the mobile station MS1 makes a decision whether to hand over from 3G network 1 to WLAN 7, as illustrated in the signalling diagram of FIG. 11.

At step S11.1, MS1 scans for the SSIDs of available networks. At step S11.2, the mobile station MS1 receives details of the SSID for WLAN 7 as previously described with reference to FIG. 5, together with broadcast information that Includes details of the operational parameters available for communication through the WLAN 7. One of the operational parameters may be bandwidth. The network operational parameters may also include details of the call costs through the network 7.

Figure 6:
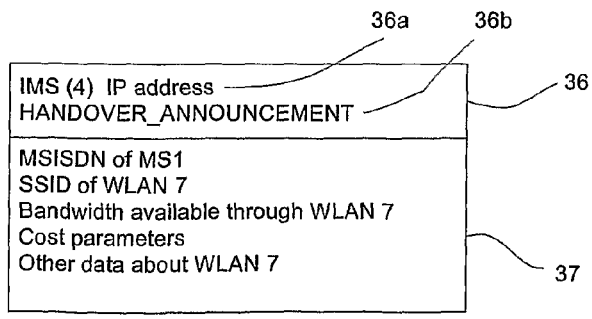
FIG. 6 is a schematic illustration of a Handover_Announcement signal in accordance with the invention.

Before making a handover to the broadband service offered by WLAN 7, the mobile station MS1 provides the network 1 with an opportunity to improve upon the communication parameters currently available for the video download to obviate the need to perform a handover to the WLAN 7. To this end, the mobile station MS1 transmits a handover announcement the IMS 3', which may be conveyed through the network 1. As previously explained, the handover announcement signal may comprise a SIP signal as shown in FIG. 6. The handover signal includes the identity (MSISDN) of MS1 and the identity of (SSID) WLAN 7 together with communication parameters available if a communication were to be established through WLAN 7 e.g. bandwidth available through network 7, cost parameters for communications to the network 7 and other relevant data. This data may have been communicated to MS1 at step S11.2 or may be available at IMS 3' in a database 42 shown schematically in FIG. 3.

Upon receipt of the SIP handover announcement, the IMS 3' of service provider 6 negotiates with IMS 3 of network 1 which in turn negotiates with the controller 30 of network 1 to determine whether improved operational parameters for communication can be provided by the network 1 to obviate the requirement for a handover to WLAN 7. In this way, the network 1 may be able to continue providing a service to the mobile station MS1 for the download and prevent the service from transferring to WLAN 7.

In a modification, the handover announcement is sent by MS1 directly to IMS 3 to initiate the negotiations with controller 30 to provide improved operational parameters.

The outcome of the negotiations performed at step S11.4 is communicated by the controller 30 to IMS 3' at step S11.5, and then to MS1 at step S11.6.

Then, at step S11.7 a handover decision is made. The decision may made at the mobile station MS1 on the basis of a comparison between the bandwidth, charging rate and other key data for WLAN 7 and the newly negotiated bandwidth, charging rate and other data for the 3G network 1, communicated to the handset in step S11.6, in the manner previously described with reference to FIG. 7. The handover decision-making process may be performed or assisted by the software 9-2 held in memory 9 and run on processor 8 shown in FIG. 2.

Also, a preliminary handover decision may be made at IMS 3' and the outcome downloaded to the handset MS1 at step S11.6. Thus, the IMS 3' may make a handover recommendation on the basis of a comparison between the updated data for network 1 provided at step S5.6 and corresponding data for WLAN 7. The data for network 7 may be derived from the database 42 shown in FIG. 3, which includes a database of characteristics for WLAN 7 and other such LANs available through the core IP network 2. This may avoid the need to transmit some of the parameters for the WLAN 7 such a bandwidth and/or cost parameters in the data payload 36 of the handover announcement signal shown in FIG. 6.

Thus, the data downloaded at step S11.6 can include a handover recommendation which can either be accepted automatically at the mobile station MS1 or may be displayed to the subscriber for a final handover decision.

After making the handover decision, MS1 can continue with the download either through WLAN 7 or network 1 as previously described with reference to FIGS. 8 and 9 although with the data being downloaded from server 4' of the service provider 6 rather than from server 4 as in the first example.

3. WLAN to WLAN Handover.

Figure 12:
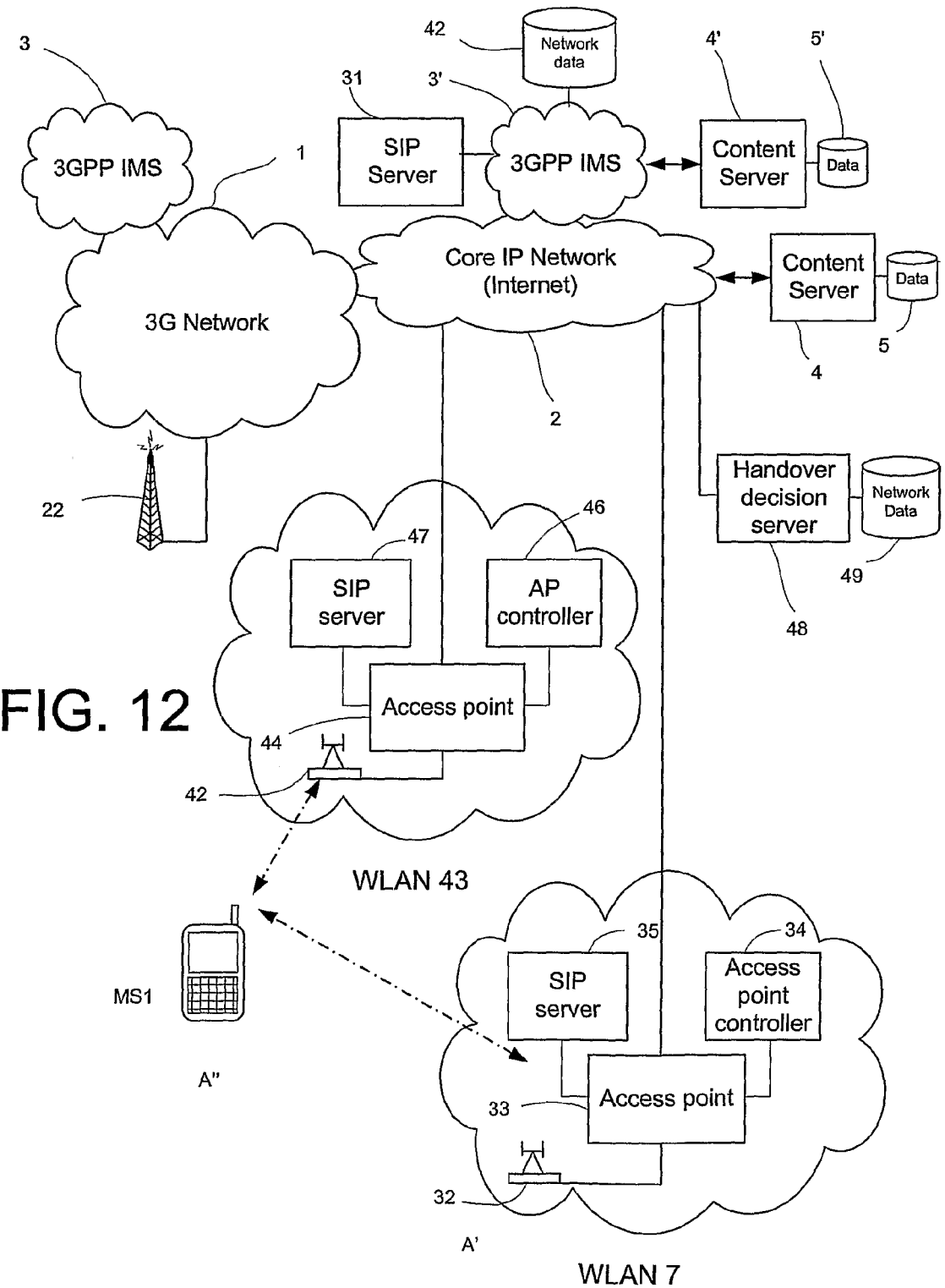
FIG. 12 is a schematic network diagram to illustrate a WLAN-WLAN handover.

Referring to FIG. 12, in a third example of the invention, the handset MS1, having been in location A' where it communicates through WLAN 7, moves to a location A' in which it may communicate with either WLAN 7 or WLAN 43 also connected to the core IP network 2. Thus, decision needs to be made whether to continue communication through WLAN 7 or to hand over to WLAN 43.

Figure 13:
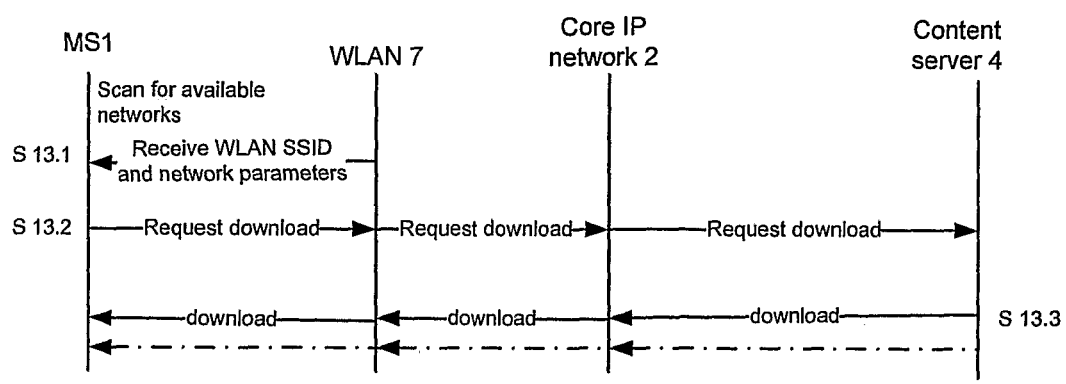
FIG. 13 is a signalling diagram for initially downloading content from a content server through a first WLAN.

FIG. 13 is a signalling diagram for MS1 when in location A', in communication solely with WLAN 7. At step 13.1, MS1 scans for available networks and discovers the SSID of WLAN 7 together with its operational parameters available for a download. At step 13.2, MS1 sends a SIP request for a download from content server 4 to WLAN 7, which is processed by SIP server 35 and application controller 34, to be routed to the content server 4. Alternatively the SIP download request may be routed by SIP server 35 to IMS 3' which manages the download from content server 4.

In the event that the subscriber for MS1 wishes to proceed with the download, the download request is transmitted at step S13.3 to WLAN 7 and then through Internet 2 to content server 4. The download is commenced at step S13.4, such that the requested media is downloaded through networks 2 and 7 to MS1 using the requested bandwidth and other communication parameters specified at step S13.1.

Figure 14:
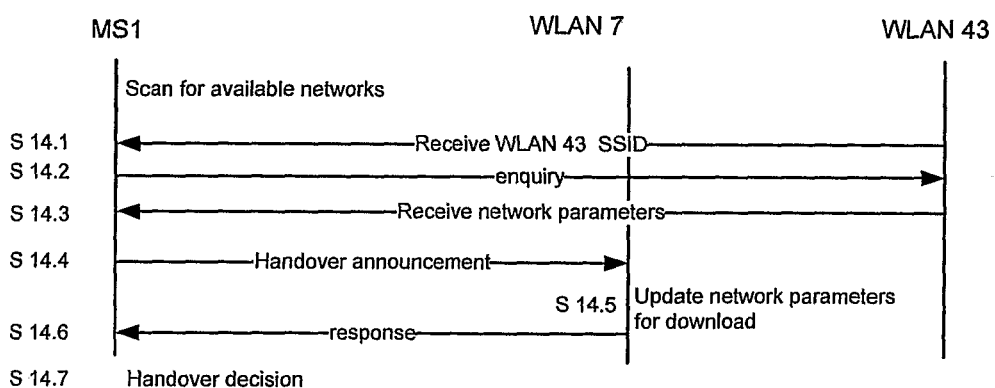
FIG. 14 illustrates a signalling diagram for sending a handover announcement to the first WLAN when a second WLAN is encountered.

FIG. 14 illustrates the situation when mobile MS1 station moves to location A'. Here, it can communicate with both WLAN 7 and WLAN 43.

The WLAN 43 is of a similar network architecture to WLAN 7 and comprises an antenna 44, transceiver/modem 45, application controller 46 and SIP server 47.

Referring to the signalling diagram of FIG. 14, at step S14.1, mobile station MS1 scans for available networks and receives the SSID from WLAN 43. At step 14.2, the mobile station MS1 requests from WLAN 43 details of communication parameters for the download, if a handover were to be made to network 43. A corresponding response is provided at step S14.3.

Then, at step S14.4, a handover announcement is sent to WLAN 7, in a form of a SIP request, generally as described with reference to FIG. 6, including the identity of the network WLAN 43 to which the handover is proposed and details of the network parameters for network 43.

At step S14.5, the request is processed by SIP server 35 and applications controller 34 to determine if an improved set of communication parameters can be provided so that the download can continue through WLAN 7 rather handover to WLAN 43. The communication parameters developed as a result of the negotiation are sent at step S14.6 to MS1.

Figure 15:
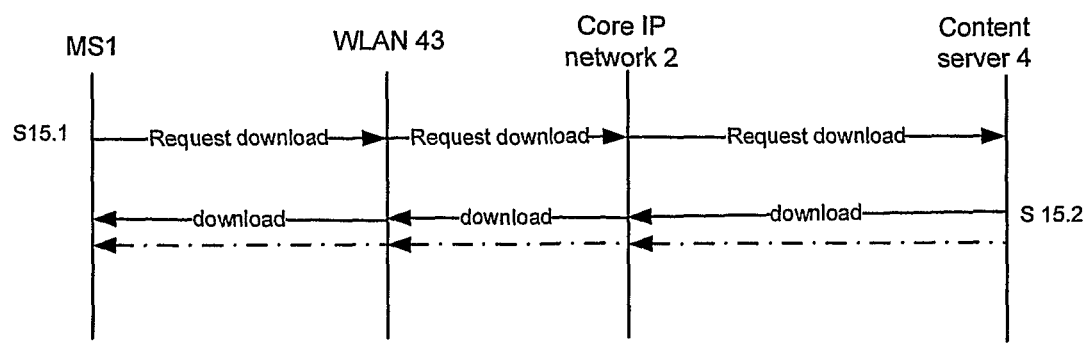
FIG. 15 illustrates a continuance of the download through the second WLAN when a decision to handover to the second WLAN.
Figure 16:
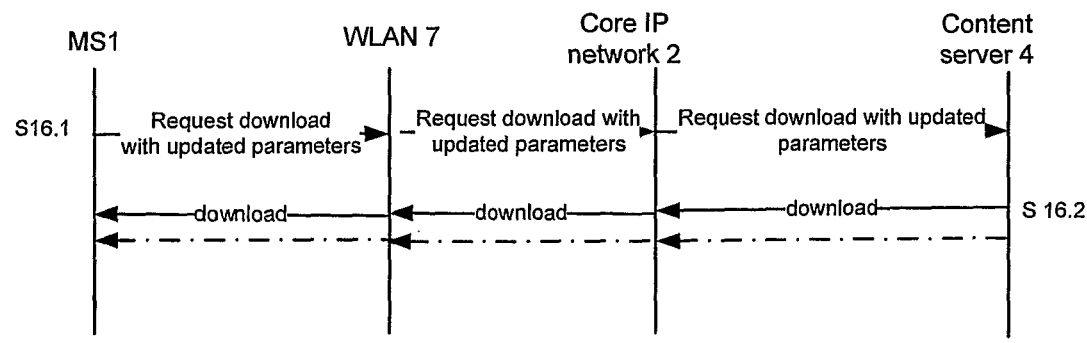
FIG. 16 illustrates continuance of the download through the first WLAN when a handover decision is to continue with the first WLAN

The handover decision can be made at mobile station MS1 in a manner previously described or at other locations within the network. For example, data corresponding to the operational parameters for series of different WLANs may be stored in network data store 42 or at other locations in the network and the decision making process may be carried out remotely of the handset using such stored data. For example, a dedicated server 48 shown in FIG. 2, with a data store 49 may be provided to make handover decisions. The decision making process may itself be distributed at different nodes in the network. Once MS1 has made or is appraised of the handover decision, the download can continue either through WLAN 7 or WLAN 43 depending on the outcome of the decision. If the decision is to handover to WLAN 43, the download proceeds as illustrated in FIG. 15. At step S15.1, the download is requested as a SIP request conveyed by MS1 to WLAN 43, to be conveyed to the content server 4. Then, the download continues at step S15.2 through the core IP network 2 and WLAN 43 to MS1 according to the network parameters offered by WLAN 43.

Alternatively, if the handover decision is to remain with WLAN 7, MS1 at step S16.1 requests the continuance of the download with the negotiated updated parameter at step S16.1, the request being conveyed to content server 4 through IP network 2. The download then commences at step S16.2 according to the updated parameters, network 7 having been set to operate according to the updated, negotiated parameters determined at step S14.4.

Many modifications and variations fall within the scope of the invention. For example, whilst the described example relates to the downloading of data, similar methodology can be applied to uploading of data from the mobile station MS1 to a remote location through the networks.

Furthermore, whilst the invention has been described in relation to a 3G network and a WLAN, the methodology can be applied to handovers between other types of networks such as satellite networks, different cellular networks and different types of wireless networks including WIMax, Bluetooth and others.

Furthermore, the invention can be used to negotiate between more than two networks. For example, the mobile station MS1 may come within the coverage area of the 3G network 1 and more than one WLAN. The SIP handover announcement at step S5.3 can be in these circumstances be broadcast to more than one network so that each may make its "best offer" of communication parameters for handling the communication with the mobile station MS1.

The invention is not restricted to wireless networks. Also networks other than with a radio air interface can be used, for example networks that use optical communication techniques such as infrared.

The invention claimed is:

1. A method for a mobile network to retain a connection with a terminal operable to communicate through different mobile networks, the method comprising the steps of:
    establishing a communication between the mobile network and the terminal under a first set of operational parameters,
    receiving an announcement for a network handover at a node in the mobile network from the terminal, the announcement indicating that the terminal has identified a second network capable of supporting the communication under a second set of operational parameters, and
    the mobile network responding to the announcement before said terminal makes said announced handover, by updating operational parameters for the communication currently established with the mobile terminal, wherein the updated operational parameters obviate any requirement for the terminal to handover the communication to the identified second network.

2. A network configured to perform a method as claimed in claim 1.

3. A method performed at a terminal operable to communicate through different networks, to determine whether to make a network handover, comprising:
    after having established a communication with the terminal through a first of the mobile networks under a first set of operational parameters, identifying a second network capable of supporting the communication under a second set of operational parameters, sending an announcement for said network handover from the terminal, and configuring the terminal to receive a response to the handover announcement from the first network, the response indicating that the first network will provide updated operational parameters for the communication obviating said announced network handover to the second network, such that a handover for the communication from the first to the second network can be initiated selectively in dependence on the response.

4. A method according to claim 3 wherein the response includes data corresponding to the updated operational parameters for communication through the first network, and providing said updated parameters for the first network and the operational parameters for the second network so that a handover decision can be made based on a comparison of the parameters.

5. A method according to claim 4 including displaying the operational parameters on a display device at the terminal.

6. A method according to claim 3 including processing data corresponding to the updated parameters for the first network and the parameters for the second network in a data processor to make said handover decision.

7. A method according to claim 3 including configuring the handover announcement signal to include announced values of operational parameters based on the operational parameters offered for communication through the second network.

8. A method according to claim 3 wherein the communication is for packet data, and including sending the handover announcement signal as a SIP signal for a packet data communication.

9. A method according to claim 3 including sending the handover announcement signal addressed to a service that uses said communication through the first network to download data to the terminal, whereby to permit said service to negotiate the updated operational parameters for the first network.

10. A method according to claim 9 wherein said service has an associated store of data for operational parameters for the second network and including comparing the said updated operational parameters for the first network with corresponding data for the second network derived from said store.

11. A method according to claim 3 wherein the terminal comprises a mobile station, and the identifying of the second network is performed when the mobile station roams into the coverage area of the second network.

12. A method according to claim 3 including performing a handover to the second network subsequent to the handover decision, to establish communication according to the operational parameters for the second network.

13. A method according to claim 3 including continuing communication through the first network subsequent to the handover decision, according to the updated operational parameters for the first network.

14. A terminal configured to perform a method according to claim 3.

15. A non-transitory computer-readable storage medium storing a computer program executed by a processor of a terminal according to claim 14.

16. A method of operating a first network, comprising:
receiving a handover announcement from a terminal signalling that it is to roam to a second network,
determining if communication for the terminal can be established through the first network according to updated operational parameters, said updated operational parameters obviating roaming to the second network by the terminal, and changing the operational parameters of the first network to enable the communication to continue through the first network.

17. A method according to claim 16 wherein the response includes data corresponding to the updated operational parameters for communication through the first network, and including providing said updated parameters for the first network for comparison with the operational parameters for the second network so that a handover decision can be made.

18. A method according to claim 16 including sending a response based on the updated parameters for the first network to the terminal.

19. A method according to claim 16 including processing data corresponding to the updated parameters for the first network and the parameters for the second network in a data processor for said handover decision.

20. A method according to claim 16 including receiving a handover announcement signal that includes announced values of operational parameters based on the operational parameters offered for communication through the second network.

21. A method according to claim 16 wherein the communication is for packet data, and including conveying the handover announcement signal as a SIP signal for a packet data communication.

22. A method according to claim 16 including conveying the handover announcement signal addressed to a service that uses said communication through the first network to download data to the terminal, whereby to permit said service to negotiate the updated operational parameters for the first network.

23. A method according to claim 22 wherein said service has an associated store of data for operational parameters for the second network and including comparing the said updated operational parameters for the first network with corresponding data for the second network derived from said store.

24. A method according to claim 16 including continuing communication through the first network subsequent to the handover decision, according to the updated operational parameters for the first network.

25. A method of providing a data delivery service through different networks to a terminal, comprising:
delivering content in a communication established through a first network with a first set of operational parameters,
receiving an announcement for a network handover signal from the terminal that signals an impending network handover to a second network,
negotiating updated operational parameters for the first network, said updated operational parameters obviating said impending handover by the terminal to the second network,
determining to continue with the delivery of content through the first network responsive to the updated network parameters.

26. A method performed between different networks, to determine whether to make a network handover, the method comprising:
after having established a communication with a terminal through a first of the networks under a first set of operational parameters, identifying a second network capable of supporting the communication under a second set of operational parameters,
sending an announcement for a network handover from the terminal, providing for the first network in response to the announcement, updated operational parameters for the communication, said operational parameters obviating the handover to the second network as announced, and determining whether to perform a handover to the second network, based on a comparison of the updated parameters for the first network and the operational parameters for second network.

27. A method according to claim 26 wherein the handover decision is made at the terminal.

28. A method according to claim 26 wherein a handover recommendation is made by a service that delivers data to the terminal through the networks.

29. A terminal comprising a processor configured to send a handover announcement signal sent by the terminal to a first network, to signal that it is to roam to a second network, the handover announcement including announced values of operational parameters for network communication based on operational communication parameters available through the second network for the terminal, whereby to provide the first network an opportunity to change its operational parameters for communication with the terminal to obviate roaming to the second network.

30. A terminal operable to communicate through different networks, comprising:
a processor configuration operable after having established a communication with the terminal through a first of the networks under a first set of operational parameters, to identify a second network capable of supporting the communication under a second set of operational parameters,
an interface to send a handover announcement from the terminal when the second network is identified, and
the processor configuration being operable to receive a response to the handover announcement from the first network, indicating that the first network will provide updated operational parameters for the communication for obviating a handover to the second network, for determining whether to make a handover for the communication from the first to the second network.

31. A network arrangement to provide for a handover for a roaming terminal, comprising:
first and second mobile networks,
a terminal operable to establish a communication through the first mobile network under a first set of operational parameters, the terminal being operable to identify when the second network is capable of supporting the communication under a second set of operational parameters, and to send a handover announcement to the first network,
means responsive to the handover announcement to provide for the first network, updated operational parameters for the communication obviating the announced handover to the second network, and
means to enable a decision to be made by the terminal whether to perform a handover to the second network, based on a comparison of the updated parameters for the first network and the operational parameters for second network.

32. A network arrangement according to claim 31 wherein the first network is a cellular telecommunications network and the second network is a local wireless network.

33. A network arrangement according to claim 31 wherein the first and the second networks are local wireless networks.

34. A network arrangement according to claim 31 including a service provider operable to provide content to be downloaded to the terminal, the service provider being configured to make or contribute to the making of said decision.

35. A network arrangement according to claim 31 including a content provider operable to provide content to be downloaded to the terminal through either of the first and second networks.

36. A first mobile network, from which a terminal can roam to a second mobile network, the first mobile network comprising
means to receive a handover announcement from a terminal signalling that it is to roam to the second mobile network,
means to determine if communication for the terminal can be established through the first network according to updated operational parameters, said updated operational parameters obviating roaming to the second network by the terminal, and for changing the operational parameters of the first network to enable the communication to continue through the first network.

* * * * *